Figure 1:
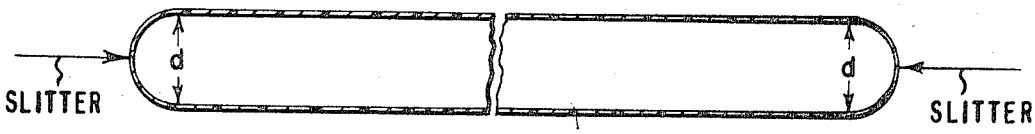
Figure 2:
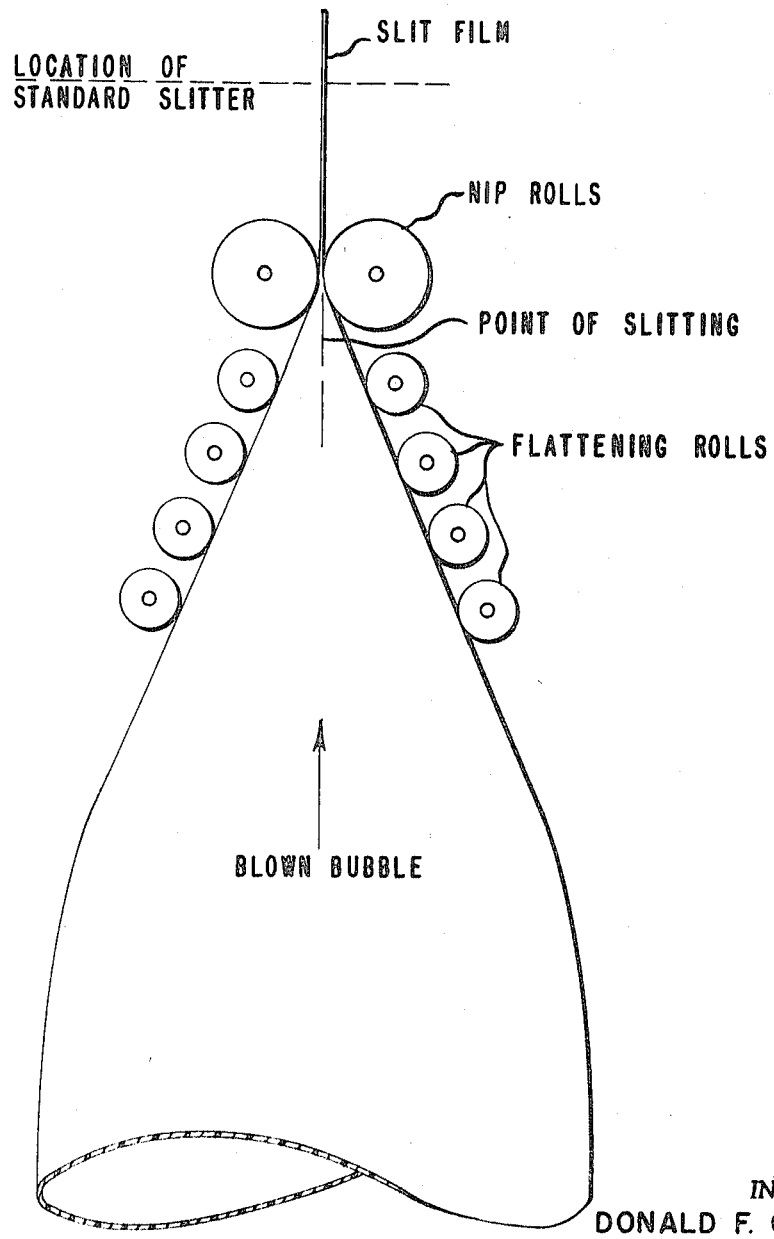

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 21, 1972

896 O.G. 832

T896,038

EXTERNAL SLITTING AFTER TUBULAR FILM PREPARATION

Donald F. Griffin, Clinton, Iowa, assignor to E. I. du Pont de Nemours and Company, Wilmington, Del.

Continuation of abandoned application Ser. No. 796,530, Feb. 4, 1969. This application Dec. 23, 1970, Ser. No. 101,125

Int. Cl. B29c *17/07, 17/14, 17/16*

U.S. Cl. 264—95

1 Sheet Drawing. 7 Pages Specification

In a process for preparing a thermoplastic film such as polyethylene or polypropylene by (a) extruding the molten thermoplastic material into a tubular film;

(b) expanding the tubular film by the application of internal pressure, forming a bubble having a hoop stress, mathematically expressed as:

$$S=Pd\div 2t$$

where

S=bubble hoop stress,

P=internal pressure of the bubble, $d$=the diameter of the bubble, $t$=film thickness;

(c) flattening the tube by external pressure such as a series of rolls on opposite sides of the tube in a converging configuration;

(d) collapsing the tube by passing it through at least one set of nip rolls; and (e) slitting the edges of the collapsed tube,

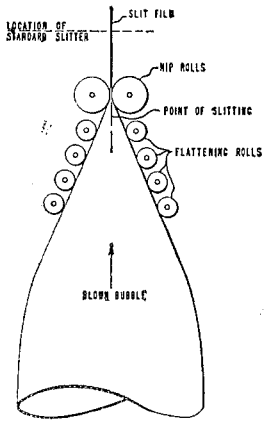

the improvement which comprises externally slitting the flattened tube along at least one lateral edge before passing the tube through the nip rolls and at a point where the bubble hoop stress is positive and less than about 10%, preferably less than 5%, of its maximum value, at full expansion, to minimize the amount of wrinkling at the slitting edge of the collapsed bubble thereby minimizing edge losses.

March 21, 1972 D. F. GRIFFIN T896,038

EXTERNAL SLITTING AFTER TUBULAR FILM PREPARATION

Filed Dec. 23, 1970

INVENTOR
DONALD F. GRIFFIN

BY Donald W. Huntley
ATTORNEY